(12) United States Patent
Kohlen

(10) Patent No.: US 6,167,778 B1
(45) Date of Patent: Jan. 2, 2001

(54) GAS PEDAL FOR A MOTOR VEHICLE

(75) Inventor: Peter Kohlen, Butzbach (DE)

(73) Assignee: Mannesmann VDO AG, Frankfurt (DE)

( * ) Notice: Under 35 U.S.C. 154(b), the term of this patent shall be extended for 0 days.

(21) Appl. No.: 09/139,906

(22) Filed: Aug. 25, 1998

(30) Foreign Application Priority Data

Aug. 27, 1997 (DE) .............................. 197 37 288

(51) Int. Cl.$^7$ ................................................. G05G 1/14
(52) U.S. Cl. .................................... 74/513; 74/560
(58) Field of Search .................... 74/513, 514, 512, 74/560; 477/133, 136, 141

(56) References Cited

U.S. PATENT DOCUMENTS

| | | | |
|---|---|---|---|
| 5,237,891 | * | 8/1993 | Neubauer et al. ............ 74/560 |
| 5,497,677 | * | 3/1996 | Baumann et al. .......... 74/560 X |

FOREIGN PATENT DOCUMENTS

| | | |
|---|---|---|
| 2162940 | 6/1973 | (DE) . |
| 3128250 | 12/1982 | (DE) . |
| 4343681 | 3/1995 | (DE) . |
| 19500666 | 7/1996 | (DE) . |
| 19531732 | 3/1997 | (DE) . |
| 19536605 | 4/1997 | (DE) . |
| 0657319 | 6/1995 | (EP) . |

OTHER PUBLICATIONS

Patents Abstracts of Japan, M–1137, Jul. 18, 1991, vol 15, No. 283 JP 3–99944 A Apr. 25, 1991.

* cited by examiner

*Primary Examiner*—Mary Ann Green
(74) *Attorney, Agent, or Firm*—Martin A. Farber

(57) ABSTRACT

A gas pedal for a motor vehicle with an automatic transmission has a kick-down stop having a movable or elastic supporting part (5) which is fastened on or in a pedal arm (2) when the pedal arm (2) has been pressed down virtually to the full extent, the supporting part (5) strikes against a stop (9). A particularly high resistance force counters any further pressing-down movement of the pedal arm (2) by displacement counter to spring force or elastic deformation of the supporting part (5).

13 Claims, 1 Drawing Sheet

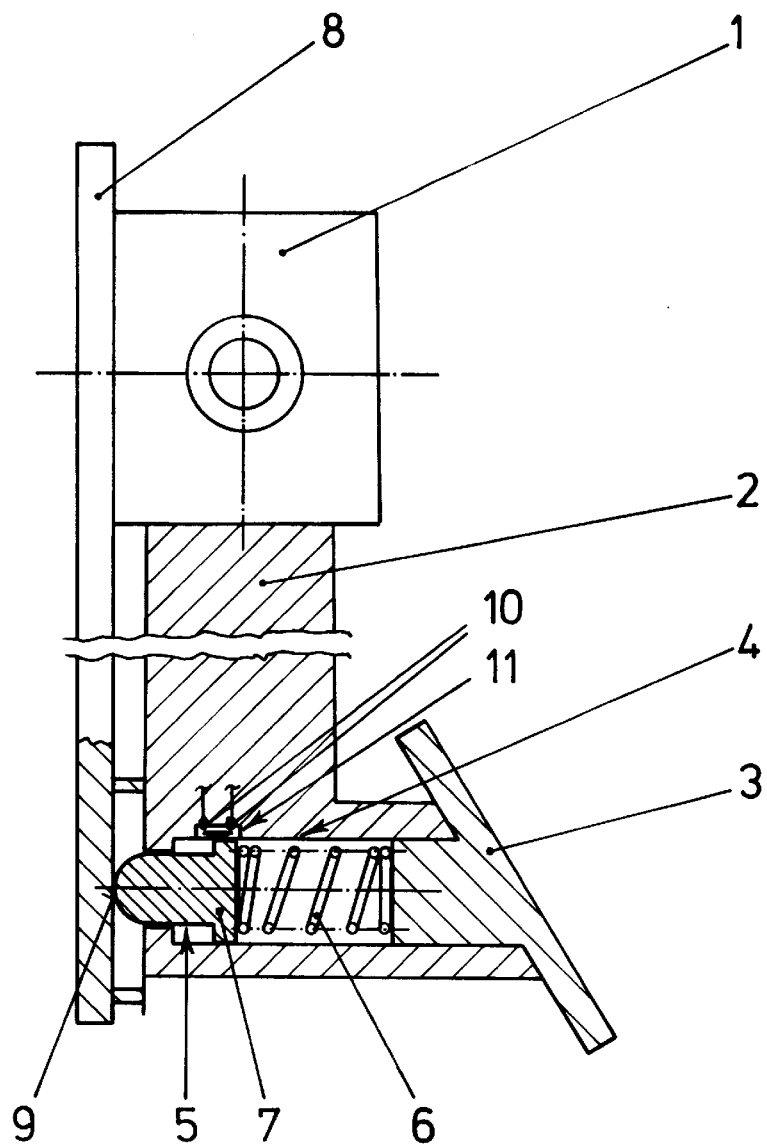
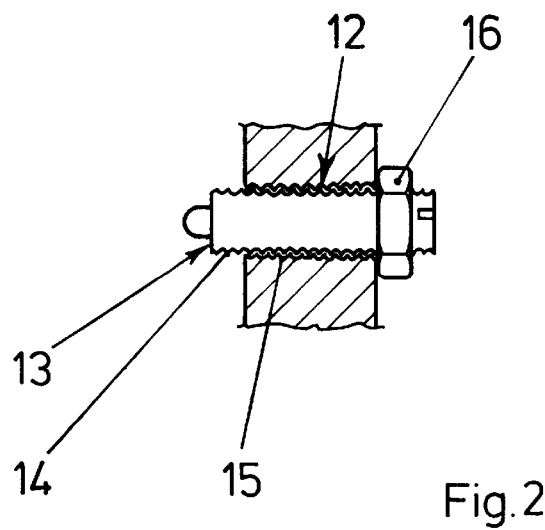
Fig. 2
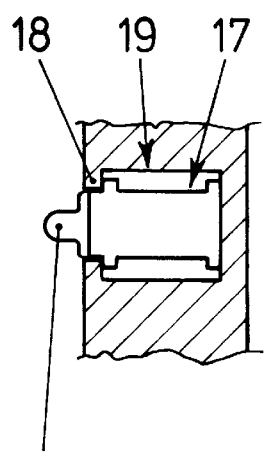
Fig. 3
Fig. 1

GAS PEDAL FOR A MOTOR VEHICLE

FIELD AND BACKGROUND OF THE INVENTION

The invention relates to a gas pedal for a motor vehicle, having a pedal arm which is retained by a retaining part, is prestressed in a basic position and can be deflected by a foot force, and having a movable supporting part which strikes against a stop when the pedal arm has been pressed down virtually to the full extent and which is intended for a kick-down stop.

Such gas pedals are often used in today's motor vehicles with automatic transmissions and are known in practice. The kick-down stop allows the driver to feel increased resistance when the pedal arm has been pressed down virtually to the full extent. If the pedal arm moves beyond this kick-down stop, the automatic transmission usually shifts down one gear. For this purpose, the pedal arm usually has a rearwardly projecting nose. The supporting part, which is designed as a spring element fastened in the retaining part, strikes against the nose when the pedal arm has been pressed down virtually to the full extent. The resistance force provided by the kick-down stop is set by the shaping of the nose.

The disadvantage with the known gas pedal is that the resistance force of the kick-down stop can change in an undesired manner. For example, the pedal arm has a small amount of lateral play, with the result that the spring element comes into contact with the nose at different points and a different resistance is thus produced with each full deflection of the pedal arm. Since, in addition, the spring element slides over the nose, the arrangement is subjected to wear, which likewise results in a change in the resistance force of the kick-down stop.

SUMMARY OF THE INVENTION

An object of the invention is to provide a gas pedal of the type mentioned in the introduction such that, when the pedal arm has been pressed down virtually to the full extent, said pedal counters an actuating force with a uniform resistance force, even in the case of large tolerances and after a relatively long operating period.

According to the invention, the supporting part is disposed (fastened on or in) the pedal arm and is arranged with its direction of movement oriented perpendicularly onto the stop.

This configuration avoids sliding of the supporting part over the stop. This means that there is virtually no wear on the supporting part or on the stop, with the result that the supporting part counters the pedal arm which has been pressed down virtually to the full extent with a particularly constant resistance over the entire operating period. Since, by virtue of the invention, the supporting part, on the kick-down stop, is loaded perpendicularly to its direction of movement, this means that the opposing resistance is particularly uniform when the pedal arm is pressed down to the full extent in each case. Furthermore, the gas pedal according to the invention is not susceptible to the effects of contamination and wetness.

According to one advantageous feature of the invention, the supporting part is of particularly simplified formation comprising a push rod which is prestressed by the spring element.

The push rod could be prestressed, for example, by a leaf spring in the direction of the stop. Alternatively, the push rod could be arranged on a group of disk springs. However, according to another advantageous feature of the invention, the supporting part can be fitted in a particularly simple manner if the spring element is a helical spring. A defined progression of the resistance over the actuating path can be produced, for example, by the winding form of the helical spring.

According to another advantageous feature of the invention, the configuration of the supporting part is particularly cost-effective if the supporting part is configured as a block produced from an elastomeric material. This allows a desired progression of the resistance force over the actuating path to be set, for example by the shaping of the block.

Further reduction in the wear on the gas pedal according to the invention is provided where, in its region which is directed toward the stop, the supporting part has a reinforcement cap.

The gas pedal according to the invention is of particularly small dimensions when the pedal arm has a recess for receiving the supporting part.

The stop for the supporting part could be provided, for example, for arrangement on a base panel of the motor vehicle. However, this would mean that the position of the kick-down stop would be dependent on the installation position of the gas pedal according to the invention. The gas pedal according to the invention, however, can be preassembled to form a unit in a particularly cost-effective manner with the step arranged on a base plate of the retaining part.

Electronic signals for activating a control arrangement of the automatic transmission can be produced in a straightforward manner, according to another advantageous feature of the invention, in that the supporting part is constructed for directly actuating an electric switch.

Further reduction in the dimensions of the gas pedal according to the invention is provided with the switch being arranged in the recess of the pedal arm, the recess receiving the supporting part.

According to another advantageous feature of the invention, the kick-down stop can be adjusted to a desired position when it is possible to adjust the position, preferably in a stepless manner, of the supporting part in relation to the gas pedal in the direction of the stop. As a result, it is also possible to compensate for production-related deviations in dimensions.

BRIEF DESCRIPTION OF THE DRAWINGS

With the above and other objects and other advantages in view, the present invention will become more clearly understood in connection with the detailed description of preferred embodiments, when considered with the accompanying drawings of which:

FIG. 1 shows a schematic illustration of the gas pedal according to the invention partially sectioned and broken away;

FIG. 2 is a broken away sectional view showing a further embodiment of the supporting part for the gas pedal according to the invention, and FIG. 3 is a broken away sectional view showing a supporting part which is produced from an elastomeric material.

DETAILED DESCRIPTION OF THE PREFERRED EMBODIMENTS

FIG. 1 is a schematic illustration of a gas pedal according to the invention with a pedal arm 2, which is mounted pivotably in a retaining part 1, shown in the fully pressed-down position (full-load position) At its end which is remote from the retaining part 1, the pedal arm 2 has a pedal plate 3 for the purpose of pressing the pedal arm 2 down. The pedal arm 2 has a recess 4 for receiving a supporting part 5 with a push rod 7 which is prestressed by a spring element 6. In the fully pressed-down position of the pedal arm 2 which is depicted, the push rod 7 has been pressed into the recess 4 of the pedal arm 2 by a stop 9 which is arranged on a base plate 8 of the retaining part 1. In this case, the push rod 7 connects contacts 10 of an electric switch 11.

The supporting part 5 and the stop 9 form a kick-down stop which in motor vehicles with automatic transmissions, when the pedal arm 2 has been pressed down substantially to the full extent, counters any further pressing-down movement with a particularly high resistance force or an increased force threshold value. Once the force threshold has been exceeded, a control electronic unit (not illustrated) of the automatic transmission receives a signal from the electric switch 11. Depending on further parameters, such as the rotational speed of the engine, the automatic transmission usually then shifts down a gear.

The positioning of the pedal plate 3 shows that the gas pedal according to the invention is intended for being fastened in a motor vehicle in a suspended manner. Of course, for corresponding positioning of the pedal plate 3, it is also possible for the gas pedal according to the invention to be fitted in the motor vehicle in an upright standing position.

FIG. 2 shows a further embodiment of a supporting part 13 arranged in a recess 12 of the pedal arm 2. The supporting part 13 has an external thread 14 (threaded sleeve) by means of which it is screwed into an internal thread 15 of the recess 12. Furthermore, a lock nut 16 is screwed on for the purpose of securing the supporting part 13 on the pedal arm 2. This allows the kick-down stop of the gas pedal according to the invention to be set in a stepless manner. This is advantageous, in particular, when the stop 9 for the supporting part 13, said stop being illustrated in FIG. 1, is arranged on a motor-vehicle base panel (not illustrated) and to compensate for corresponding production-related deviations in dimensions. The necessary elasticity of this from of the supporting part 13 may be provided, for example, by a push rod which can be pushed counter to a spring force within the threaded sleeve 14.

FIG. 3 shows a supporting part 17 which is produced, from an elastomeric material, as an elastomer block and is arranged in a recess 19 of the pedal arm 2. This recess 19 has a peripheral web 18 in the region of its opening. On its region which projects out of the recess 19, the supporting part 17 has a reinforcement cap 20 which is produced, for example, from steel and is intended for minimizing wear. The recess 19 has a larger diameter than the supporting part 17. As a result, the supporting part 17 can expand radially in the recess 19 when the reinforcement cap 20 strikes against the stop 9, which is illustrated in FIG. 1, and is finally pressed into the recess once the force threshold has been overcome.

The features according to FIGS. 2 and 3 can be freely combined with one another in that, for example, the supporting part 17 from FIG. 3 is fastened in the gas pedal directly within a threaded sleeve according to FIG. 2 and an equivalent of the recess 19 is provided within the threaded sleeve.

What is claimed is:
1. A gas pedal for a motor vehicle, comprising:
   a stop;
   a fixed retaining part, said stop is mounted to said retaining part;
   a pedal arm pivotally retained by said retaining part, said pedal arm being prestressed in a basic position and depressable by an actuating force;
   a movable supporting part which strikes against said stop when the pedal arm is pressed to substantially a full extent;
   wherein the supporting part is disposed on the pedal arm with a direction of movement of the supporting part oriented perpendicularly onto the stop, and said direction of movement of the supporting part being essentially in same direction as that of the pedal arm, and wherein
   the supporting part comprises a push rod, and
   a spring element prestresses said push rod, the push rod and the spring element being aligned and linearly movable in said direction of movement of the supporting part.
2. The gas pedal according to claim 1, wherein the spring element is a helical spring.
3. The gas pedal according to claim 1, wherein the pedal arm has a recess, and said supporting part is received in said recess.
4. The gas pedal according to claim 1, further comprising a base plate of the retaining part, and said stop is on said base plate.
5. The gas pedal according to claim 1, wherein
   said pedal arm has a recess,
   an electric switch is arranged in said recess of the pedal arm, and
   said recess receives the supporting part.
6. The gas pedal according to claim 1, wherein the supporting part is mounted in the pedal arm.
7. The gas pedal according to claim 1, wherein the supporting part and the stop comprise a kick-down stop.
8. The gas pedal according to claim 1, wherein said pedal arm is pivotally mounted in said retaining part.
9. A gas pedal for a motor vehicle, according to claim 1, wherein said spring element is completely mounted in said pedal arm.
10. The gas pedal according to claim 1, further comprising an electric switch which is actuatable by the supporting part.
11. The gas pedal according to claim 10, wherein the pedal arm has a recess, the supporting part is movably mounted in said recess, and wherein the electric switch is arranged in the recess of the pedal arm.
12. A gas pedal for a motor vehicle, comprising:
    a stop;
    a fixed retaining part, said stop is fixed to said retaining part;
    a pedal arm pivotally retained by said retaining part, said pedal arm being prestressed in a basic position and depressable by an actuating force;
    a movable supporting part movably disposed on said pedal arm and contacting said stop when the pedal arm is pressed to substantially a full extent, said supporting part and said stop constituting a kick-down stop; and
    wherein said pedal arm comprises guide means for guiding said movable supporting part in a direction of movement oriented perpendicularly to the stop when the supporting part contacts said stop, and said direction of movement of the supporting part being essentially in same direction as that of the pedal arm, wherein the supporting part comprises a push rod, and a spring element prestresses said push rod, the push rod and the spring element being aligned and linearly movable in said direction of movement of the supporting part.

13. A gas pedal for a motor vehicle, according to claim 12, wherein said spring element is completely mounted in said pedal arm.

* * * * *